Jan. 2, 1945.  N. A. HARRISON  2,366,619
GRANULATING APPARATUS
Filed Feb. 2, 1943  5 Sheets-Sheet 1

INVENTOR.
Norman A. Harrison
BY Lawrence K. Sager
his attorney

Jan. 2, 1945.  N. A. HARRISON  2,366,619
GRANULATING APPARATUS
Filed Feb. 2, 1943  5 Sheets-Sheet 4
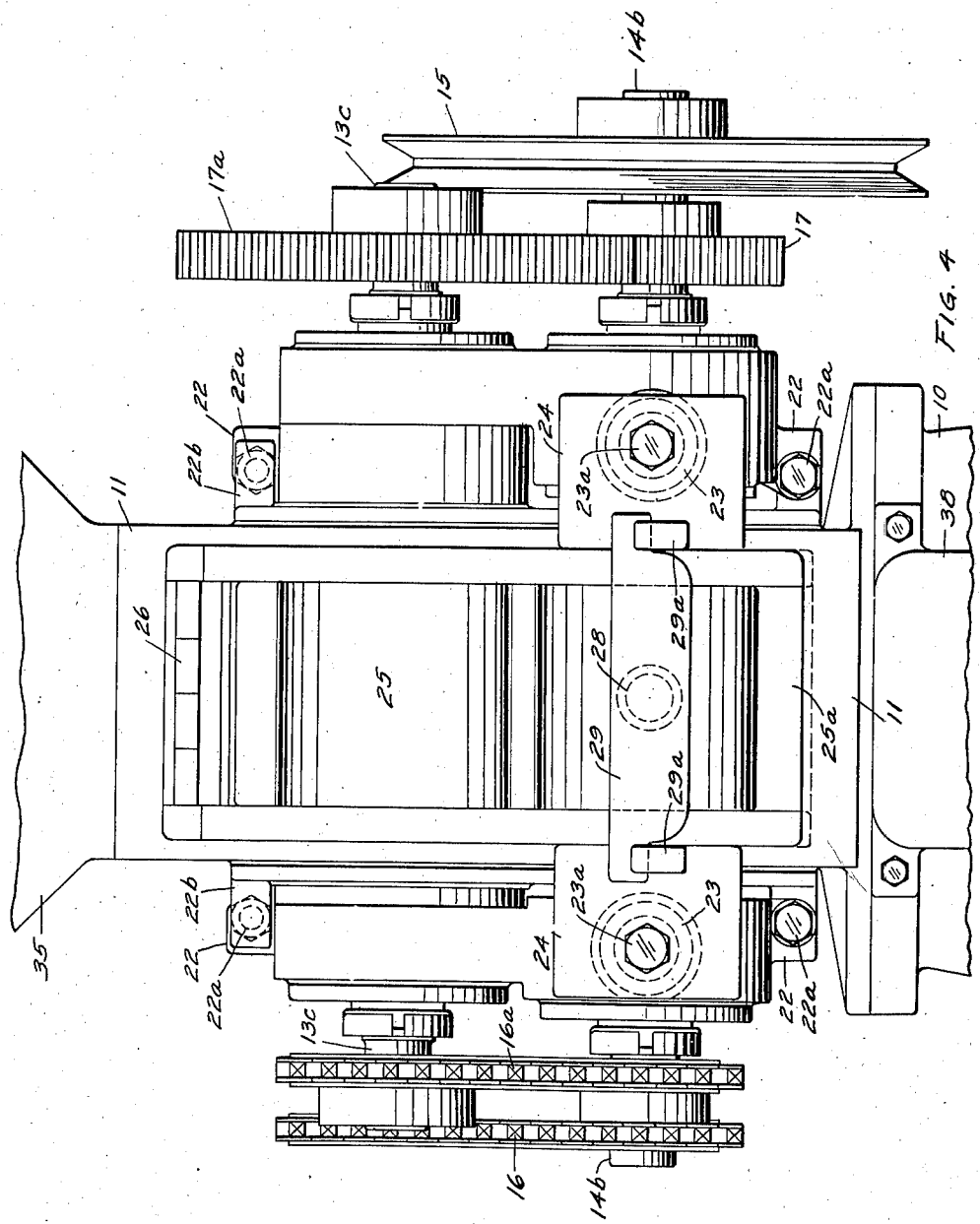
INVENTOR.
Norman A. Harrison
BY Lawrence K. Sager
his attorney.

Jan. 2, 1945.  N. A. HARRISON  2,366,619
GRANULATING APPARATUS
Filed Feb. 2, 1943  5 Sheets-Sheet 5
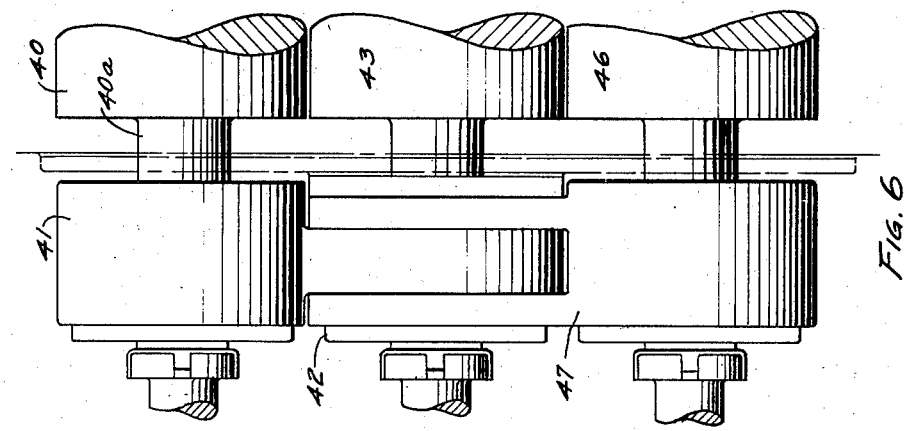
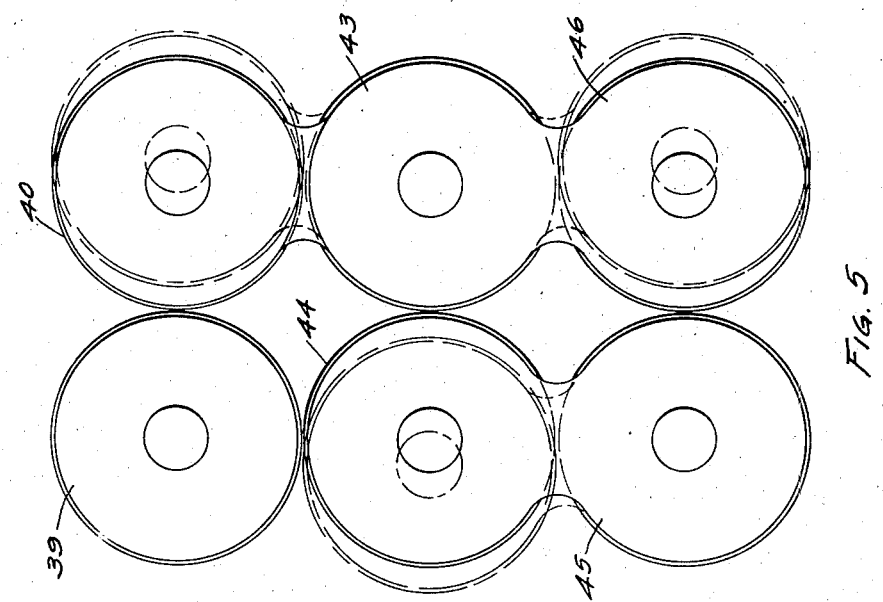
INVENTOR.
Norman A. Harrison
BY Lawrence K. Sager
his attorney.

Patented Jan. 2, 1945

2,366,619

UNITED STATES PATENT OFFICE 2,366,619

GRANULATING APPARATUS

Norman A. Harrison, Dumont, N. J., assignor to Jabez Burns & Sons, Inc., New York, N. Y., a corporation of New York Application February 2, 1943, Serial No. 474,435

10 Claims. (Cl. 241—159)

This invention relates to improved apparatus for granulating and treating material and particularly roasted coffee. The apparatus for producing such a product is of two general types, the roll type and the plate type. The former has the advantage of producing a product in which the granules are of more uniform size and of more pleasing appearance. The present invention relates to the roll type and is applicable to machines of large capacity, as well as to small machines for use as store mills.

The main object of the invention is to produce a machine wherein a definite quantity of material supplied thereto will be discharged from the outlet in the same definite amount, or so closely thereto that the difference is not material, being less than one per cent. For example, if one pound of the material is fed to the machine, it will deliver one pound from the outlet with an insignificant variation therefrom. A machine of this type is desirable particularly in store mills where a weighed quantity of the roasted coffee bean is supplied to the machine and the same weight of granulated coffee is desired to be delivered therefrom. Another object is to avoid any appreciable accumulation of material in the machine, thereby avoiding excessive heating and the necessity of more or less frequent cleaning. Another object is to produce an efficient machine of compact form. Another object is to produce a form of structure which will be sturdy and durable under long continued use. Other objects and advantages will be understood from the following description and accompanying drawings.

Figure 1:
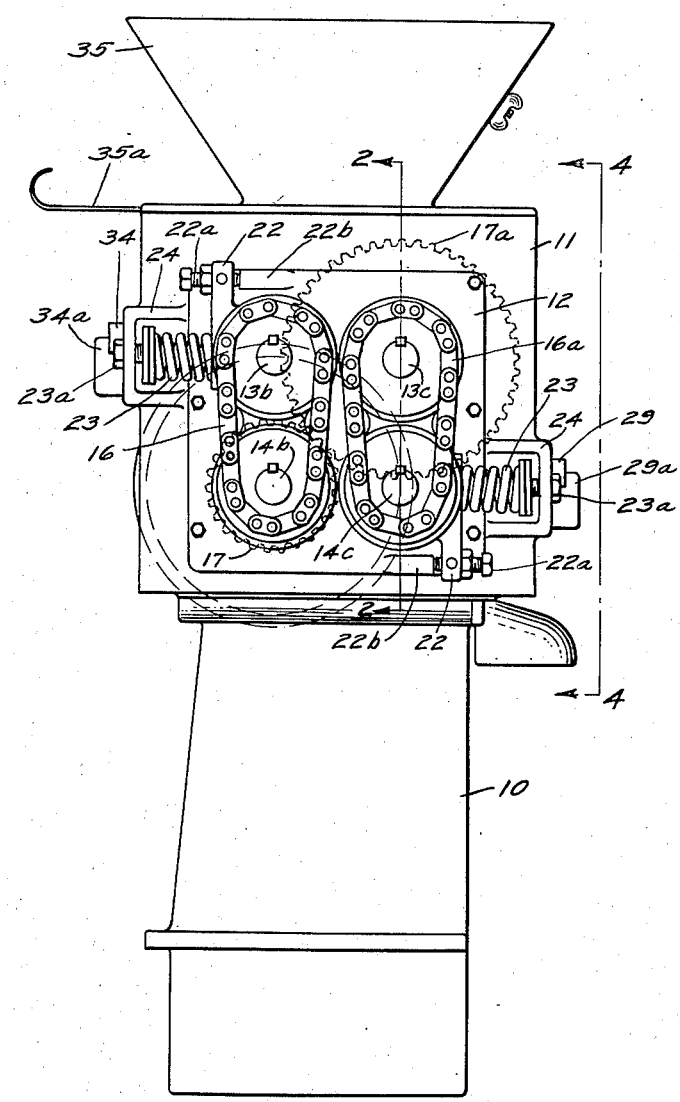
Figure 2:
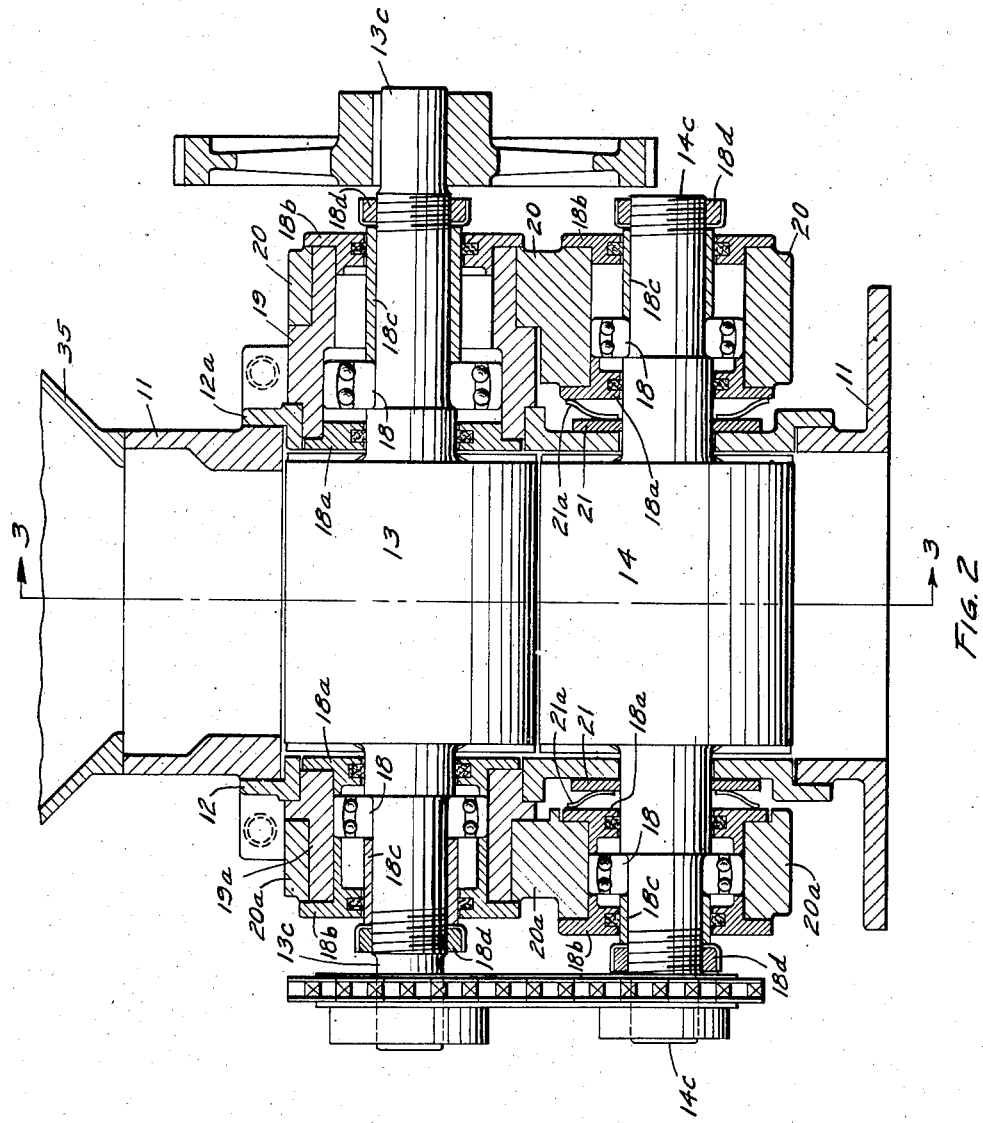
Figure 3:
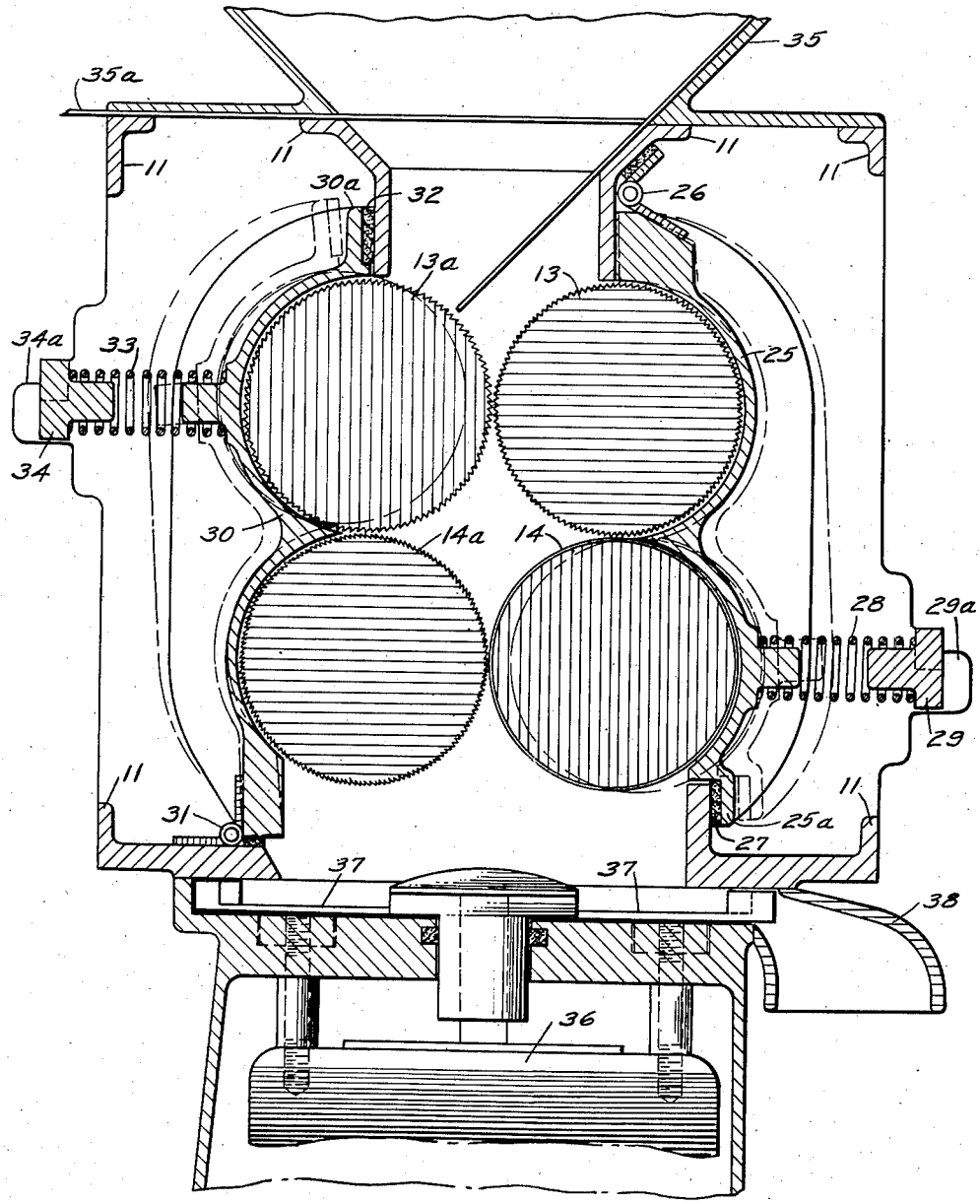

Fig. 1 is a side elevation; Fig. 2 is an enlarged vertical section on the line 2—2 of Fig. 1; Fig. 3 is a vertical section on the line 3—3 of Fig. 2; Fig. 4 is an enlarged view on the line 4—4 of Fig. 1. In each of these views the enclosing cover plates are removed. Fig. 5 is an end view and Fig. 6 is a side view of a modification showing the use of three pairs of rolls.

One of the causes of the accumulation of ground coffee or other ground material in prior forms of roll-type mills is the necessity of spacing the rolls vertically from each other in order to permit freedom of movement of the rolls when any foreign material, such as a bolt or screw, passes between the rolls. This vertical spacing permitted the ground material to pass between the upper and lower rolls and accumulate between casing and the back of the rolls. The necessity of providing for the separation of the rolls to pass foreign material also required that the enclosing casing should be spaced sufficiently from the rolls to provide room for the separation of rolls. This extra space permitted the ground material to accumulate between the rolls and the casing. These accumulations caused excessive heating requiring cleaning the machine at frequent intervals, and prevented delivery from the machine of the same weight of coffee as supplied to the machine. The present invention overcomes these difficulties by a special relationship and mounting of the rolls and by a novel relationship of the enclosing casing to the rolls.

Referring to Fig. 1, the machine is shown as provided with a supporting base 10 on which is mounted a roll housing 11 which in turn supports a removable roll housing end plate 12. A similar roll housing end plate 12a is provided on the opposite side of the machine, as shown in Fig. 2. Two pairs of rolls are shown in the machine of Figs. 1 to 4, an upper pair 13 and 13a, known as the cracker rolls, and a lower pair 14 and 14a, known as the finishing rolls, the relationship of the rolls being particularly shown in Fig. 3. The rolls of each pair are driven at different relative speeds and the power is derived from any suitable motor for driving the sheave 15 shown in Fig. 4. This directly drives the shaft 14b of the roll 14a and, as shown in Fig. 1, the opposite end of this shaft is provided with a sprocket gear which in turn drives a chain 16 which drives a sprocket wheel on the shaft 13b of one of the upper rolls. A pinion 17 on the shaft 14b drives a gear 17a on the shaft 13c of the cracker roll 13, as shown in Fig. 4. This shaft at its opposite end has a sprocket fixed thereto which in turn drives the chain 16a which engages a sprocket fixed to the shaft 14c of the roll 14. The ratio of the gearing is such that the cracker roll 13a is driven at a higher speed than the cracker roll 13; and the finishing roll 14a is driven at a higher speed than the finishing roll 14.

As shown by the full line positions of the rolls in Fig. 3, any vertical spacing between the upper and lower rolls is practically eliminated and the rolls are so close to each other as to provide only clearance between the teeth of the rolls. This close position between the upper and lower rolls of each pair is always maintained fixed regardless of whether the machine is operating normally or whether the rolls of the upper or lower pair are passing foreign material. The closing of the vertical space between the upper pair of rolls and the lower pair of rolls prevents any material amount of the ground coffee passing between them and backing up on the outside of the rolls. This close relationship between the upper and lower rolls is accomplished by pivoting one of the finishing rolls on the shaft of its corresponding cracker roll and by pivoting the other cracker roll on the shaft of the other finishing roll. In this manner the clearance space between the upper and lower rolls is maintained constant during the passage of foreign material because each pivotally supported roll may then swing about the fixed axis of its related roll. Yieldable means is provided for maintaining the rolls in their normal positions and for permitting one roll of each pair to swing outwardly when any foreign material passes between the rolls.

The structure for accomplishing this result is particularly shown in Fig. 2 wherein the axis of the roll 13 and its shaft 13c is fixed; and shaft 13c is provided with ball bearings 18 at its two ends. A bearing seal 18a is provided at opposite ends of the roll and a bearing seal 18b is provided at the outside of each bearing. Spacing sleeves 18c on the shaft are held in place by the spacer nuts 18d on threaded portions of the shaft. A bearing housing 19 encloses these parts at the right of Fig. 2 and a bearing housing 19a encloses the similar parts at the left of Fig. 2. The housing 19 also serves as a hub for pivotally supporting a hanger 20, the lower end of which forms a bearing housing for the right-hand end of the lower roll shaft 14c. The two ends of the shaft 14c are provided with ball bearings, bearing seals, bearing spacers and spacing nuts corresponding to those described with reference to the upper shaft 13c and are designated by the same reference numbers. The bearing housing 19a also serves as a hub for pivotally supporting the hanger 20a, the lower end of which forms a bearing housing for the left-hand end of the shaft 14c. The lower roll 14 is thus pivotally supported so as to enable it to swing outwardly and inwardly about the axis of the upper roll 13. The openings in the housing end plates 12 and 12a for the passage of the shaft 14c are enlarged in the direction of movement of the swinging roll; and these openings are closed by plates 21 fitted on the shaft 14, so as to slide on the housing end plates when the shaft 14c swings outwardly or inwardly. These plates serve as seals against the passage of the ground material and are maintained in place by dished spring plates 21a interposed between the plates 21 and the bearing seals 18a.

The shafts 13b and 14b of the rolls at the left of Figs. 1 and 3 are similarly journaled and housed, but instead of the lower roll being mounted to swing about the upper roll, the situation is reversed and the upper roll 13a is mounted to swing about the lower roll 14a, the axis of which is fixed. As these parts are a duplication of those described with reference to Fig. 2, except as to the reversal of the swinging relationship, they need not be particularly described or shown.

As shown in Fig. 1, an extension 22 projects downwardly from each of the bearing housings 20 and 20a of the shaft 14c and these extensions are threaded to receive adjustable bolts 22a, as more fully shown in Fig. 4. The inner ends of these bolts engage abutments 22b formed on the end plates 12 and 12a. Adjustment of the normal innermost position of the swinging roll 14 with reference to the fixed roll 14a is thereby obtained. Similarly, as shown in Figs. 1 and 4, the bearing housings of the upper swinging roll 13a are provided with extensions 22 and adjustable bolts 22a which seat against abutments 22b on the end plates for limiting the inner position of the roll 13a with reference to the fixed roll 13.

The lower roll 14 is yieldably maintained in its normal position by a pair of springs 23. The inner end of each of these springs presses against the side of its respective bearing housing and the outer end of each spring seats against the inner end of an adjustable bolt 23a which is mounted in a bracket 24 of U form, forming a part of roll housing 11. When any foreign material, such as a bolt, passes between the lower pair of rolls, the roll 14 will be forced outwardly against the pressure of the springs 23 swinging about the axis of the fixed roll 13 as a center; and after the passage of the foreign material, the swinging roll will be returned to its normal position by the pressure of the springs. During this action the spacing between the lower roll 14 and the upper roll 13 is maintained constant by reason of the pivotal movement of one roll about the other. This avoids the enlargement of the spacing between these rolls during the passage of any foreign material and thereby prevents the ground material from passing between the upper and lower rolls and backing up around the outside of the rolls. Similarly the upper swinging roll 13a is yieldably held in its normal position by the provision of corresponding springs 23, adjustable bolts 23a and brackets 24 at each end of the shaft of the roll 13a. When any foreign material passes between the upper pair of rolls, the roll 13a is thereby enabled to swing outwardly about the axis of the lower roll 14a without changing the spacing between the upper and lower rolls. Thus, referring to Fig. 1, the passage of any foreign material between the upper pair of rolls causes the upper left-hand cracker roll to swing outwardly and the passage of the foreign material between the lower pair of rolls causes the right-hand finishing roll to swing outwardly.

The main frame housing 11 is open at the two sides of the rolls and the rolls are enclosed at the sides by a pair of yieldable roll closures. They closely embrace the sides of the rolls and under normal conditions the spacing of the closures from the rolls is only sufficient for clearance. This prevents the formation of any spaces or pockets for the accumulation of any ground material. When any foreign material passes between the rolls and one roll or the other of a pair is forced outwardly in the manner already described, the corresponding yieldable roll closure is forced outwardly by the roll; and after the passage of the foreign material, the roll closure is returned to its normal position. The structure for accomplishing this purpose is particularly shown in Figs. 3 and 4. The right-hand portion of Fig. 3 shows one of the roll closures 25 which is pivotally supported by a hinge 26 at its upper end, the hinge being fixed to the upper portion of the housing 11. The closure 25 extends downwardly closely surrounding the outside of the roll 13 and projects inwardly between the rolls 13 and 14 and also closely embraces the roll 14. A lower portion 25a of the closure extends over a portion of the housing and a seal 27 of felt or other material is interposed between the parts. The width of the closure 25, as shown in Fig. 4, is sufficient to cover the sides of the rolls. A roll closure spring 28 is interposed between the lower portion of the closure 25 and a saddle 29 which is fixed in position and removably carried at its ends by a pair of notched lugs 29a which extend from the brackets 24. Similarly the outside of the other upper and lower rolls is enclosed by a similar roll closure 30, as shown in Fig. 3; but in this case the closure is pivoted at its lower end on the housing by the hinge 31. The upper end of this closure carries an extension 30a which engages a downward extension on the housing with an intervening seal 32. A spring 33 is positioned between an upper portion of the closure 30 and a saddle 34 which is removably supported at its ends in notched lugs 34a extending from the upper pair of brackets 24, as indicated in Fig. 1.

Referring to Fig. 3, when any foreign material passes between the upper pair of rolls, the roll 13a is forced to the left on the axis of the roll 14a as a center, as already explained, and the roll forces the closure 30 to the left about its pivot 31 against the pressure of the spring 33. This abnormal position of the parts is shown by the dotted lines in Fig. 3. After the passage of the foreign material, the roll 13a is forced to its normal position by its springs 23; and the closure 30 is returned to its normal position by the spring 33. When the foreign material passes between the lower pair of rolls, the roll 14 is swung outwardly with the axis of the roll 13 as a center and in turn forces the lower portion of the closure 25 outwardly on its pivot 26 against the pressure of the spring 28. The abnormal position of the closure 25 and the roll 14 is shown by dotted lines in Fig. 3. After the passage of the foreign material, the roll springs 23 and the roll closure spring 28 return the parts to their normal position.

It is apparent by this improved structure that there are no spaces or pockets for the accumulation of granulated material, whether the mill is operating normally or whether the parts are swung on their pivots during the passage of foreign material. Likewise there are no spaces through which the ground material may pass from its normal course and thereby any tendency of the material to pack up or to separate any of the parts is avoided. The improved structure insures that the machine will deliver pound for pound without any appreciable deviation therefrom which makes the apparatus particularly desirable for store use where the unground material is first weighed and then delivered to the customer after grinding. As no material can accumulate in the machine, it avoids the necessity of the dismantling and frequent cleaning of the parts.

Referring to the remaining portions of the apparatus, a feed hopper 35 is shown mounted on the top of the main housing frame, the feed being controlled by a feed shut-off slide 35a. Within the base 10 a motor 36 may be conveniently housed for driving the arms 37. These arms are rotated by the motor and receive the material as discharged from the finishing rolls and force it outwardly through the discharge spout 38. As these parts form no part of the present invention, they need not be particularly described.

Although the improvement has been particularly shown and described with reference to the use of two pairs of rolls, it is applicable to any number of roll pairs. Figs. 5 and 6 show the relative mounting and relationship of the rolls when three pairs are used. Referring to Fig. 5, the upper left-hand roll 39 is mounted on a shaft which has a fixed axis, whereas the upper right-hand roll 40 has its shaft 40a mounted in a bearing which is carried by a hanger 41 which in turn is pivotally mounted on the bearing housing 42 of the next lower roll 43. The axis of the roll 43 is fixed which permits the roll 40 to swing outwardly on this axis as a center when any foreign material passes between the upper rolls. The shaft of the middle left-hand roll 44 is carried by a hanger which is pivotally mounted on the bearing housing of the lower left-hand roll in the manner already described. This permits the middle roll 44 to swing outwardly on the axis of the lower roll as a center for permitting the passage of foreign material between the middle pair of rolls. The axis of the lower left-hand roll 45 is fixed and the lower right-hand roll 46 has its shaft mounted in a bearing which is carried by a hanger 47 which is pivotally mounted on the bearing housing 42 of the roll 43. When any foreign material passes between the lower pair of rolls, the roll 46 is forced outwardly on the axis of the roll 43 as a center. Fig. 5 shows in dotted lines the abnormal position of the rolls for permitting the passage of foreign material. It will be understood that the pivotally mounted parts shown in Figs. 5 and 6 are to be provided with roll closure springs and that yieldable roll closures would likewise be provided in the manner described with reference to Figs. 1 to 4.

Although particular embodiments of the invention have been disclosed, it will be understood that various modifications and adaptations of the invention may be made for particular requirements without departing from the scope of the invention.

I claim:

1. A machine for granulating coffee and the like, comprising a plurality of pairs of rolls, said pairs of rolls being closely positioned driving means for rotating the rolls, one roll of each pair having a fixed axis, and means for yieldably supporting the other roll of each pair to be movable in an arc when displaced from normal position the center of said arc being the axis of the roll of the other pair having the fixed axis.

2. A machine for granulating coffee and the like, comprising a plurality of pairs of rolls, said pairs of rolls being closely positioned driving means for rotating the rolls, one roll of each pair having a fixed axis, means for pivotally supporting the other roll of each pair to be movable when displaced from normal position, the center of said movement being the axis of the roll of the other pair having the fixed axis, and yieldable means for maintaining the pivotally supported rolls in normal position.

3. A machine for granulating coffee and the like, comprising a pair of cooperating rolls side by side, a second pair of cooperating rolls closely positioned below the first named pair, driving means for rotating the rolls, one roll of the upper pair and a diagonally opposite roll of the lower pair having fixed axes, means for supporting the other roll of the upper pair to be movable in an arc when displaced from normal position, the center of said arc being the axis of the lower roll having the fixed axis, means for supporting the other roll of the lower pair to be movable in an arc when displaced from normal position, the center of said latter arc being the axis of the upper roll having the fixed axis, and yieldable means for maintaining the movably supported rolls in normal cooperating position with the rolls having the fixed axes.

4. A machine for granulating coffee and the like, comprising a pair of cooperating rolls side by side, a second pair of cooperating rolls closely positioned below the first named pair, driving means for rotating the rolls, one roll of the upper pair and a diagonally opposite roll of the lower pair having fixed axes, means for pivotally supporting the other roll of the upper pair to be movable when displaced from normal position, the center of said movement being the axis of the roll of the lower pair having the fixed axis, means for pivotally supporting the other roll of the lower pair to be movable when displaced from normal position, the center of which movement is the axis of the upper roll having the fixed axis, and yieldable means for maintaining the movably supported rolls in normal cooperating position with the rolls having the fixed axes.

5. A machine for granulating coffee and the like, comprising a pair of cooperating rolls side by side, a second pair of cooperating rolls closely positioned below the first named pair, driving means for rotating the rolls, bearing supports for one roll of the upper pair having the axis thereof fixed, bearing supports for the diagonally opposite roll of the lower pair having the axis thereof fixed, bearing supports for the other roll of the upper pair pivotally movable on the bearing supports of the lower roll having the fixed axis, bearing supports for the other roll of the lower pair movable on the bearing supports of the upper roll having the fixed axis, and yieldable means for maintaining the pivotally supported rolls in normal cooperating position with the rolls having the fixed axes.

6. A machine for granulating coffee and the like, comprising a pair of cooperating rolls side by side, a second pair of cooperating rolls closely positioned below the first named pair, driving means for rotating the rolls, one roll of the upper pair and a diagonally opposite roll of the lower pair having fixed axes, means for supporting the other roll of the upper pair to be movable in an arc when displaced from normal position, the center of said arc being the axis of the lower roll having the fixed axis, means for supporting the other roll of the lower pair to be movable in an arc when displaced from normal position, the center of said latter arc being the axis of the upper roll having the fixed axis, yieldable means for maintaining the movably supported rolls in normal cooperating position with the rolls having the fixed axes, a main housing, said housing having openings opposite the movably supported rolls, a yieldable closure for one of said openings closely covering portions of the roll of the upper pair having a fixed axis and a portion of the movable roll of the lower pair and movable thereby when displaced from normal position, and a second yieldable closure for the other of said openings closely covering portions of the lower roll having the fixed axis and of the upper movable roll and movable thereby when displaced from normal position.

7. A machine for granulating coffee and the like, comprising a pair of cooperating granulating elements, means for mounting one of said elements to be displaceable from the other of said elements for the passage of foreign material between said elements, a main housing, said housing having an opening opposite the said displaceable element, a closure for said opening covering a portion of said displaceable element, and means for yieldably supporting said closure, said displaceable element being movable towards said closure upon the passage of foreign material between said elements for reducing the space between said element and said closure, said closure being forced outwardly from its normal position by such movement.

8. A machine for granulating coffee and the like, comprising a pair of cooperating rolls side by side, means for mounting one of said rolls to be displaceable from the other upon the passage of foreign material between the rolls, a main housing, said housing having an opening opposite the displaceable roll, a closure for said opening closely covering a portion of the displaceable roll, and means for yieldably supporting said closure, said displaceable roll being movable towards said closure upon the passage of foreign material between said rolls for reducing the space between said displaceable roll and said closure, said closure being forced outwardly from its normal position by such movement.

9. A machine for granulating coffee and the like, comprising a pair of cooperating rolls side by side, a second pair of cooperating rolls closely positioned below the first named pair, driving means for rotating the rolls, means for supporting one roll of each pair to be displaceable from the other roll of each pair for the passage of foreign material between the rolls, a main housing, said housing having an opening opposite each of said displaceable rolls respectively, closures for said openings respectively covering portions of said displaceable rolls, and means for yieldably supporting said closures, said displaceable rolls being movable towards said closures respectively upon the passage of foreign material between the rolls for reducing the space between said rolls and closures, said closures being forced outwardly from their normal positions by such movement.

10. A machine for granulating coffee and the like, comprising a pair of cooperating rolls side by side, a second pair of cooperating rolls closely positioned below the first named pair, driving means for rotating the rolls, one roll of the upper pair and a diagonally opposite roll of the lower pair having a fixed axis, means for supporting the other roll of the upper pair to be movable in an arc when displaced from normal position, the center of said arc being the axis of the lower roll having the fixed axis, means for supporting the other roll of the lower pair to be movable in an arc when displaced from normal position, the center of said arc being the axis of the upper roll having the fixed axis, yieldable means for maintaining the movably supported rolls in normal cooperating position with the rolls having the fixed axes, a main housing, said housing having openings opposite the movably supported rolls, closures for said openings covering portions of said movable rolls respectively, and means for yieldably supporting said closures, said movably supported rolls being movable towards said closures respectively upon the passage of foreign material between the rolls for reducing the space between said rolls and closures, said closures being forced outwardly from their normal positions by such movement.

NORMAN A. HARRISON.